(12) United States Patent
Soman et al.

(10) Patent No.: US 6,850,616 B2
(45) Date of Patent: Feb. 1, 2005

(54) FREQUENCY ERROR DETECTION METHODS AND SYSTEMS USING THE SAME

(75) Inventors: Manoj Soman, Pune (IN); Sachin Ghanekar, Pune (IN); Rajendra Datar, Pune (IN)

(73) Assignee: Cirrus Logic, Inc., Austin, TX (US)

( * ) Notice: Subject to any disclaimer, the term of this patent is extended or adjusted under 35 U.S.C. 154(b) by 505 days.

(21) Appl. No.: 09/767,545

(22) Filed: Jan. 22, 2001

(65) Prior Publication Data

US 2002/0097860 A1 Jul. 25, 2002

(51) Int. Cl.$^7$ .......................... H04M 1/00; H04M 3/00
(52) U.S. Cl. .................. 379/386; 379/282; 379/283
(58) Field of Search ...................... 379/386, 251, 379/252, 286, 282, 283, 284; 370/352

(56) References Cited

U.S. PATENT DOCUMENTS

| | | | | |
|---|---|---|---|---|
| 5,187,721 A | * | 2/1993 | Wong | |
| 5,619,564 A | * | 4/1997 | Canniff et al. | 379/386 |
| 5,734,577 A | * | 3/1998 | Chesir et al. | |
| 5,765,125 A | * | 6/1998 | Dougherty et al. | 704/225 |
| 5,809,133 A | * | 9/1998 | Bartkowiak et al. | 379/386 |
| 6,236,724 B1 | * | 5/2001 | Labaton et al. | |

* cited by examiner

*Primary Examiner*—Rexford Barnie
(74) *Attorney, Agent, or Firm*—Thompson & Knight LLP; James J. Murphy

(57) ABSTRACT

A method of detecting frequency errors exceeding a predetermined limit in a sampled signal includes the step of determining a peak amplitude of the signal at a tone frequency for a first frame of samples of the sampled signals using a filter having a first amplitude versus frequency response. A peak amplitude of signal at the tone frequency is determined for a second frame of samples of the sampled signal using a filter having a second amplitude versus frequency response. A ratio between the peak amplitude of the first frame and the peak amplitude of the second frame is calculated and compared against a threshold to detect frequency errors exceeding the predetermined limit. Among other things, this method decouples the frequency error detection problem from the twist factor estimation problem.

19 Claims, 6 Drawing Sheets

FREQUENCY ERROR DETECTION METHODS AND SYSTEMS USING THE SAME

BACKGROUND OF THE INVENTION

1. Field of the Invention

The present invention relates in general to analog signalling and in particular, to frequency error detection methods and systems using the same.

2. Description of the Related Art

Dual Tone Multiple Frequency (DTMF) encoding is a common form of signaling used in telecommunications applications, such as touch-tone telephones. Typically, a composite signal representing given information (e.g. a letter or number) is generated by summing two audible tones of different frequencies. This composite signal is then transmitted, for example over the telephone lines, and then decoded at the receiving end to recover the original information.

Consider the typical touch-tone phone. The number buttons, along with the * and # buttons, are arranged in a rectangular array of rows and columns. Each row and each column is associated with a distinct frequency. In the conventional telecommunications scheme, the standard row frequencies are 697 Hz, 770 Hz, 852 Hz and 941 Hz and the standard column frequencies are 1209 Hz, 1336 Hz, 1477 Hz and 1633 Hz. Thus, when a given button is pressed, a composite signal is generated from the frequencies assigned to the corresponding row and column. For example, if the "1" button is pressed, the composite signal is generated from the Row 1 frequency of 697 Hz and the Column 1 frequency of 1209 Hz.

While DTMF signaling is relatively straightforward in theory, several difficulties arise in practical applications. Among other things, the frequencies and pulse width must be controlled to insure the integrity of the encoding process. Generally, the DTMF telecommunications specification requires that frequencies within 1.5% of nominal always be detected, those with 3.5% or more frequency error never be detected, and those with a frequency error in the range of 1.5 to 3.5% be interpreted as "don't care." Similarly, pulses longer than 40 ms should always be detected, those shorter than 23 ms should never be detected, and those having a pulse width in the range of 23–40 ms should be interpreted as "don't care." The minimum amplitude which must be detected is −36 dB.

The DTMF specification accounts for some signal degradation during transmission. There are two primary forms of degradation that must be considered during the detection process, name, Twist Factor and Tone Frequency Tolerance. The Twist Factor is essentially the difference in amplitude of the different frequencies making up the composite signal as a result of non-uniform power loss. Typically, the detector must be capable of detecting a signal. When power is high, frequency tone should be within +4 to −8 dB of the low frequency tone. Tone frequency tolerance is specified in terms of percentage of nominal frequencies. For example, a disallowed 3.5% variation at the tone frequency of 697 Hz is 24 Hz. At the same time, an allowed frequency variation of 1.5% at 1633 Hz is also 24 Hz. Hence, using an absolute tolerance (e.g. 24 Hz) as a basis for determining if a tone is within tolerance will lead to erroneous results.

DTMF has many advantages, and therefore improvements in the circuits and methods of signal detection are highly desirable. Correct tone detection with optimized time of detection overhead leads to quicker establishment of calls, which in turn improves infrastructure utilization.

SUMMARY OF THE INVENTION

A method is disclosed for detecting frequency errors in a sampled signal exceeding a predetermined limit. A peak amplitude of the tone frequency is detected for a first frame of the samples using a filter having a first amplitude versus frequency response and a peak amplitude of the tone frequency is determined for a second frame of samples using a filter having a second amplitude versus frequency response. A ratio is calculated between the peak amplitude of the first frame and the peak amplitude of the second frame, the ratio compared against a threshold to detect frequency errors exceeding the predetermined limit.

The principles of the present invention provide an efficient means for detecting frequency deviation in a transmitted signal. This method decouples the frequency error detection problem from the twist factor estimation problem and this makes it robust. Among other things, processing overhead is minimized all through the reuse of data used to implement the first filter during the implementation of the second filter. This is particularly advantageous in embodiments employing a digital signal processor or similar digital filtering device. The inventive concepts can be applied to any one of a number of applications, including DTMF tone decoding, Doppler Shift detection, and frequency domain multiple access applications.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIGS. 1–5C of the drawings, in which like numbers designate like parts.

Figure 1A:
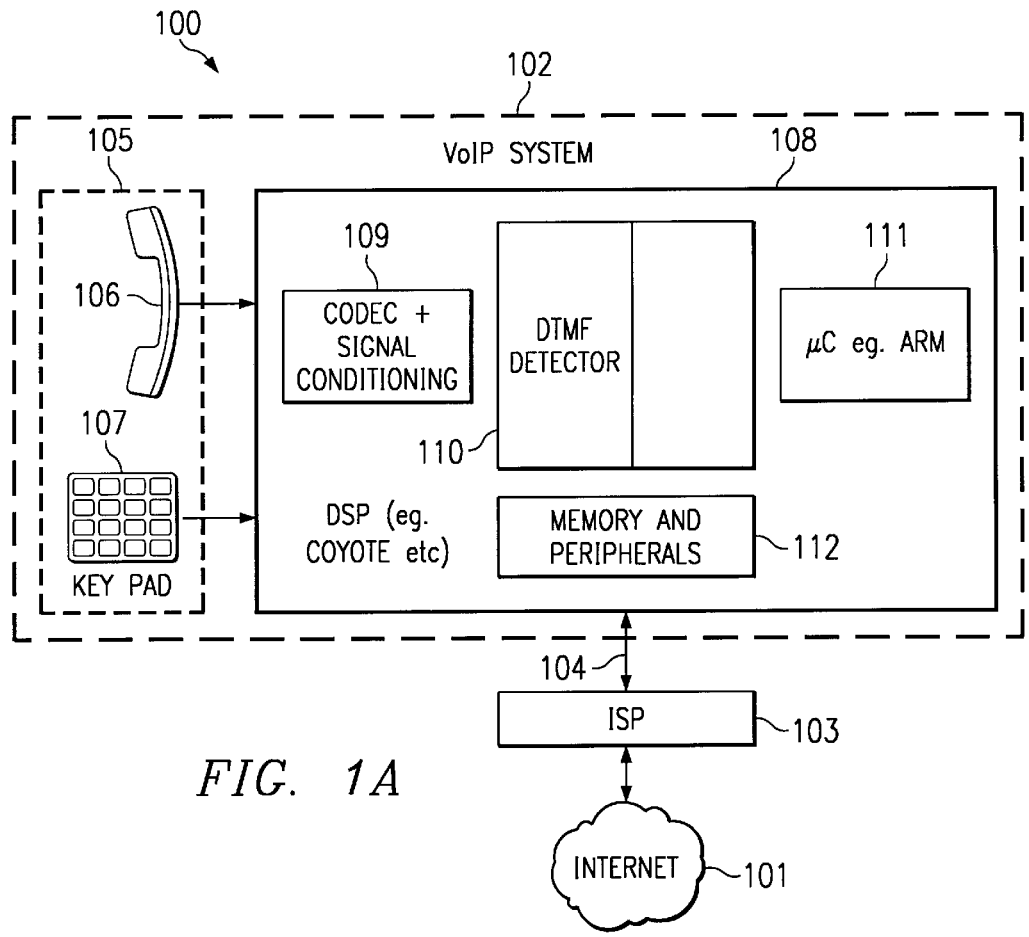
FIG. 1A is a functional block diagram of a VoIP system which allows voice and data communications across an Internet Protocol network (Internet)

FIG. 1A is a functional block diagram of a VoIP system 100 which allows voice and data communications across an Internet Protocol network (Internet) 101. At the highest level, system 100 includes an end-user terminal 102 communicating with Internet 101 through an Internet Service Provider (ISP) and a corresponding telecommunications connection 104 (e.g. a conventional telephone line, Digital Subscriber Line, cable, or wireless link) or direct digital link.

End-user terminal includes a set of input/output (I/O) devices 105. For purposes of the present invention, an audio hand- or headset 106 is shown, along with a DTMF keypad 107. In actual embodiments, input/output devices 105 may also include a computer keyboard, display and/or audio speaker system.

In the illustrated embodiment, end-user terminal 102 is based on an information processing system 108 including a digital signal processor 110, a microprocessor 111, along with memory and peripherals 112. Voice and DTMF data being exchanged between I/O devices 105 and DSP 110 interface through a code-decode (Codec) and signal conditioning unit 109.

Microprocessor 111 executes the program instructions necessary for overall control of system 108. DSP 108, among other things, executes the algorithms, such as filtering and compression/decompression algorithms, necessary to process voice and audio data. With respects to the preferred embodiment of the present inventive principles described below, DSP also performs DTMF tone detection in response to inputs to keypad 107.

Figure 1B:
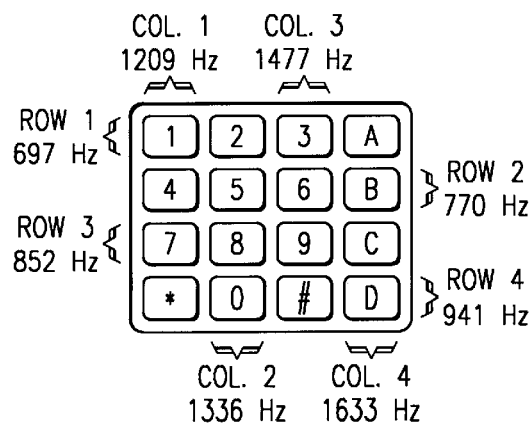
FIG. 1B illustrates one possible alpha-numeric key configuration of keypad.

FIG. 1B illustrates one possible alpha-numeric key configuration of keypad 107. In this case, four rows and four columns of keys are shown, with each row assigned a corresponding tone frequency and each column assigned a corresponding tone frequency, for a total of 8 discrete frequencies. The depression of the key at the intersection of a given row and a given column results in the generation of a DTMF signal composed of the two corresponding tone frequencies. It should be noted that the use of an alpha-numeric keypad of four rows and four columns was arbitrarily chosen for illustrative purposes. In actual applications, the number of rows and columns vary, and the keys may represent information other than the depicted alpha-numeric scheme. Notwithstanding, the theory of operation remains the same.

Figure 2A:
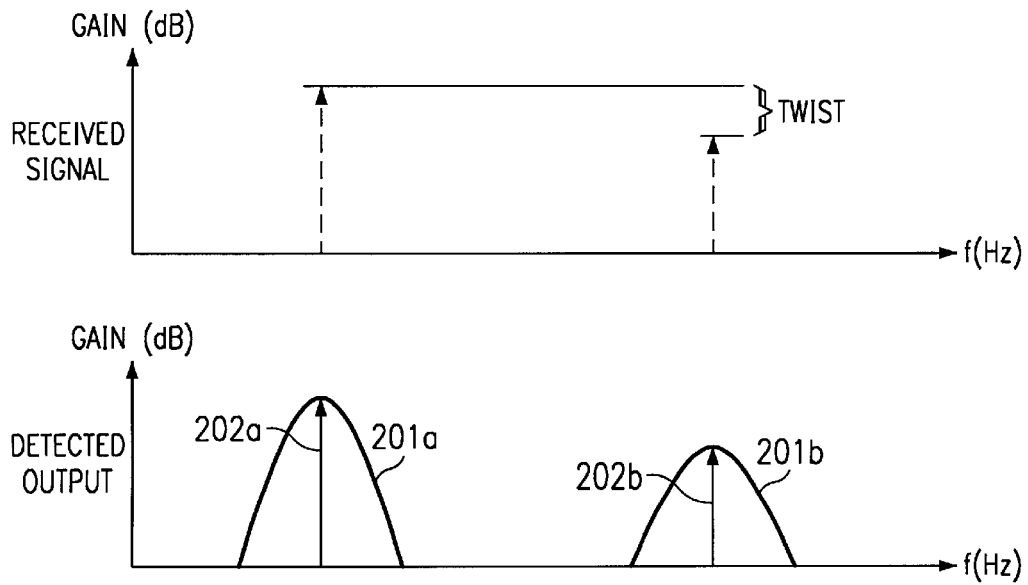
FIGS. 2A and 2B, illustrate cases where the response (gain versus frequency) curves for exemplary conventional row and column DTMF filters are shown, along with the received tones shown by dashed lined vectors and the detected tones shown by solid line vectors.
Figure 2B:
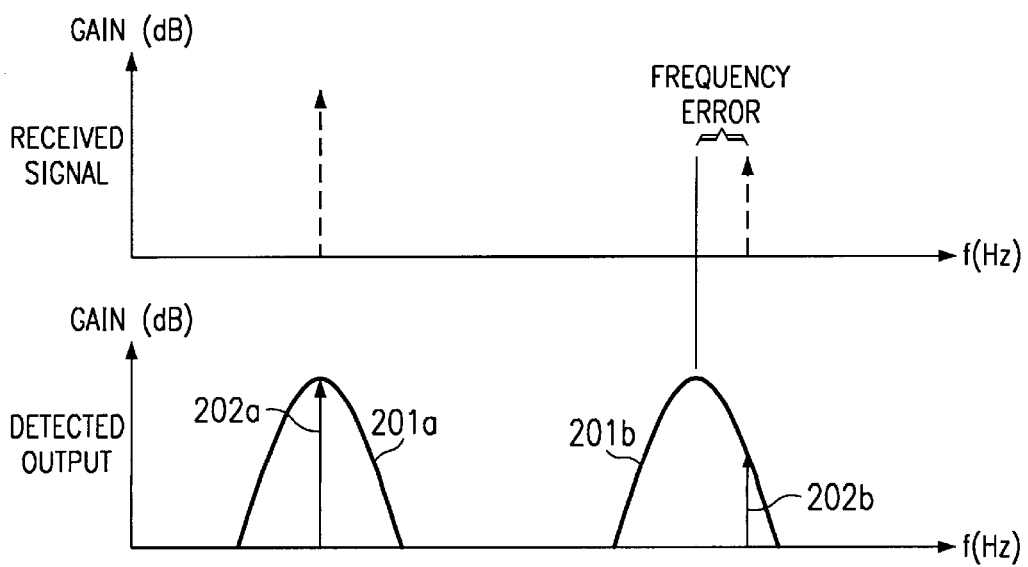

As previously indicated, the detected amplitude in the DTMF tones can vary due to either the twist factor, frequency variation, or both. In practice, it is generally not possible to distinguish the source of the amplitude loss. This is illustrated in FIGS. 2A and 2B, where the response (gain versus frequency) curves 201a,b for exemplary conventional row and column DTMF filters are shown, along with the received tones 203a,b shown by dashed lined vectors and the detected tones 202a,b shown by solid line vectors. In FIG. 2A, the error is caused by the twist factor alone, while in FIG. 2B, the error is caused by frequency deviation alone.

Figure 3:
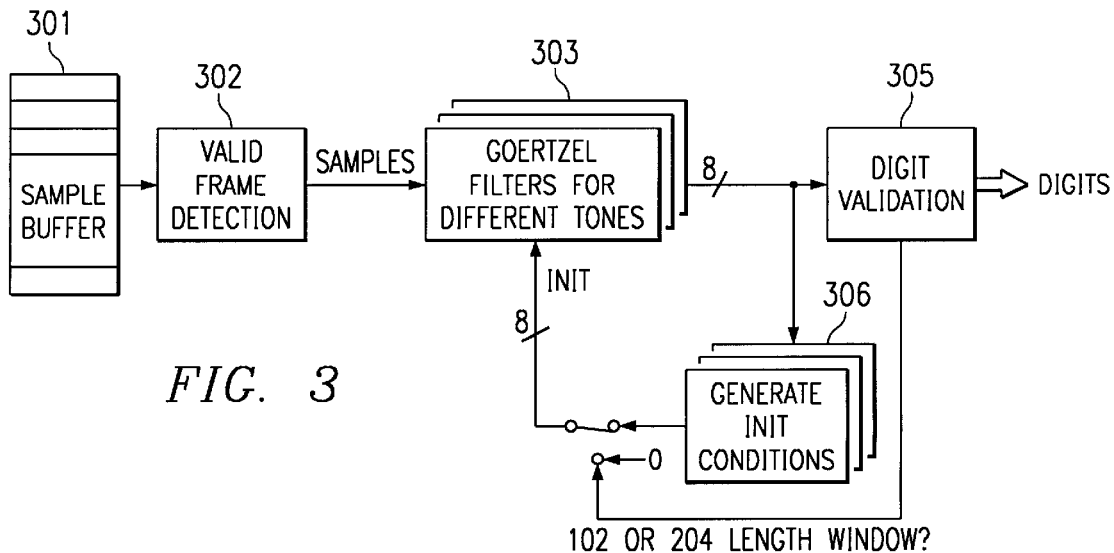
FIG. 3 illustrates functional blocks implementing by algorithms executed by DSP, although these blocks could be implemented, either in whole or in part, in discrete hardware/software devices.

In accordance with the inventive concepts, techniques are provided for detecting DTMF tones which isolate twist factor from the effects of frequency error. A conceptual block diagram of these techniques is shown in FIG. 3. Preferable, the functional blocks shown in FIG. 3 are implemented by algorithms executed by DSP 108, although these blocks could be implemented, either in whole or in part, in discrete hardware/software devices.

In the illustrated embodiment, the DTMF signal generated by the keypad is sampled in frames of 102 samples (N,M= 102). As discussed further below, two 102 frames are used during the detection process since the minimum specified DTMF pulse width is 320 samples wide. As the samples are received, they are stored in sample buffer 301. When 102 samples have been received, a flag is set the entire 102-sample frame is transferred into a temporary buffer accessible by DSP 108.

Figure 4:
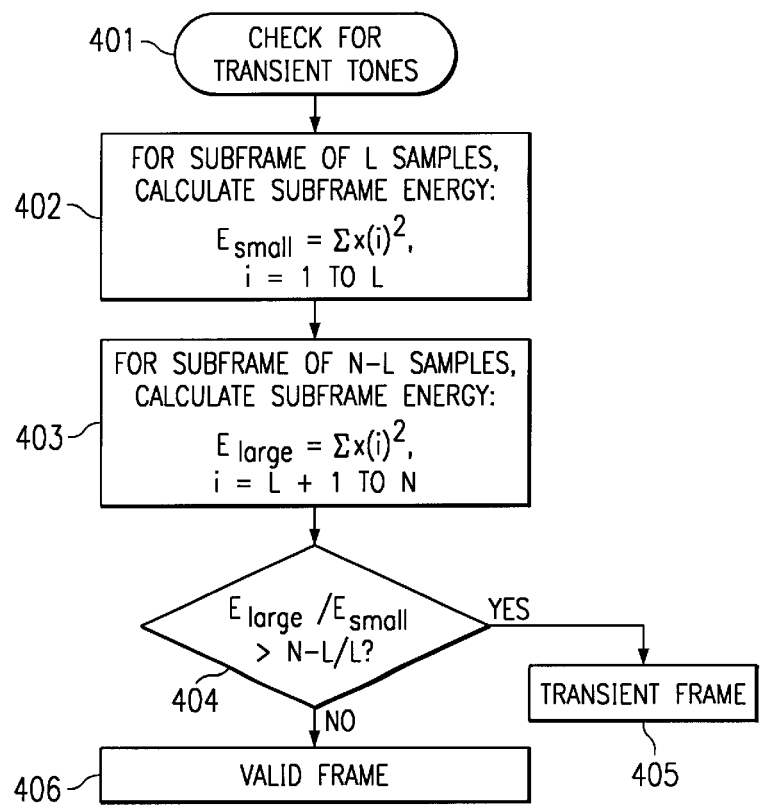
FIG. 4 illustrates a preferred frame validation procedure.

The validity of each frame is then tested at block 302 to discriminate between transient (invalid) tones and valid DTMF tones. A preferred frame validation procedure 400 is illustrated in FIG. 4. Here, the frame is divided into two subframes, a small subframe of L number of samples and large subframe of N−L number of samples, which could be for example, 20 and 82 samples respectively. The frame power for each of the two subframes is then taken at Steps 401 and 402, where the frame power for each subframe is calculated as:

$$E = \Sigma x(i)^2 \qquad (1)$$

where x(i) is the amplitude of the unfiltered samples, and i=1 to L for the small subframe and i=L+1 to N for the large subframe.

At Step 403, the ratio of energies $E_{large}/E_{small}$ is compared with the sample ratio N−L/L. If the ratio $E_{large}/E_{small}$ is close (within a selected tolerance) to the ratio N−L/L, then the frame is declared valid (Step 404). On the other hand, if $E_{large}/E_{small} \gg$ N−L/L, then the frame is declared a transient frame (Step 405) and is not processed further.

After frame validation, the samples are passed to a bank of 8 Goertzel filters 303, one for each of the eight possible DTMF tones in the illustrated system. Two N sample frames (indexed frames i and j respectively where j=i+1) are used for each detection, with the initial conditions for the second frame being derived during the calculation of the first frame. A preferred filtering procedure 500 for implementing a selected one of the eight Goertzel filters is illustrated in FIGURE 5C.

The Goetzel filters used in the preferred embodiment of the present invention can be described by the equations:

$$v_K(n) = 2\cos(\omega_K)v_k(n-1) - v_k(n-2) + x(n) \qquad (2)$$

$$y_k(N) = v_K(N) - \exp[-j\ w_K]v_K(N-1) = X(k) \qquad (3)$$

$$E_K = y_K(N)y_K^*(N) \qquad (4)$$

where k=1 to 8 is the index for the filter, n=1 to N is the current sample in a N sample frame, and $E_k$ is the energy at frequency $\omega_k$.

At Step 501, the initial conditions are set for the first sample of the first frame, with init(1)=init(2)=0. At Step 502, the first two values of $V_k$, namely $V_k(0)$ and $V_k(1)$ in accordance with Equation (2). Thereafter, Equation (2) is iteratively applied at Steps 503–505. Specifically, so long as the end of the frame has not been reached (i.e. n≤N−1), samples of amplitude x(n) are retrieved from the sample buffer and the current value $v_k(n)$ calculated.

After Equation (2) has been iteratively applied, an intermediate value $v_{K\_}$ partial(N) is calculated at Step 506 in accordance with Equation (5):

$$v_{k\_}\text{partial}(N) = 2\cos(\omega_K) \cdot v_k(N-1) \cdot v_k(N-2) \qquad (5)$$

The peak energy for each filtered tone in the first frame can be calculated by taking $|Y_k(N)|^2$. Notwithstanding, according to the inventive concepts, a more straight forward operation is to use the intermediate result vk_partial(N) calculated at Step 506 and at Step 507 in the operation:

$$E_i(N) = v_K(N-1)^2 + v_{K\_}\text{partial}(N)^2 - 2\cos(\omega_k) \cdot v_K(N-1) \cdot v_{K\_}\text{partial}(N) \qquad (6)$$

The computed value of $E_i(N)$ is evaluated at Step 508, and if an invalid tone is detected, the process returns to Step 501, otherwise the process continues to Step 509.

According to the inventive concepts, the results obtained from filtering the first frame of N samples are used as the initial conditions for filtering the second frame of M samples. Specifically, the new initial values are taken at Step 509, where init(1) is the value of vk_partial(N) and init(2) is the value of vk(N−1) for the last frame.

The first two values of $V_k$, $V_k(0)$ and $V_k(1)$ are calculated at Step 510 using Equation (2) and the initial condition from Step 509. Equation (2) is then iteratively applied to the remainder of the second frame (i.e. m≦M) to calculate vk(M) at Steps 511–513.

Using Eq. (5), the intermediate result vk_partial(M) is calculated for the second frame (Step 514) along with the peak energy for the frame $E_j(M)$ (Step 515).

The use of the results from the processing of the first frame as initial conditions for processing the second frame substantially reduces processing time. For example, in the present case where N=M=102, the processing of the entire 204 samples takes approximately half the time which would have been required if a 204sample frame was directly calculated as discussed above.

To determine whether the tone being processed by the given filter has a frequency error within or outside of the maximum specified, the ratio energy $E_i(N)$ for the N sample to the energy $E_j(M)$ is analyzed at Step 516. $E_j(M)$ effectively corresponds to the energy of N+M samples, hence scaled appropriately for comparison.

Figure 5A:
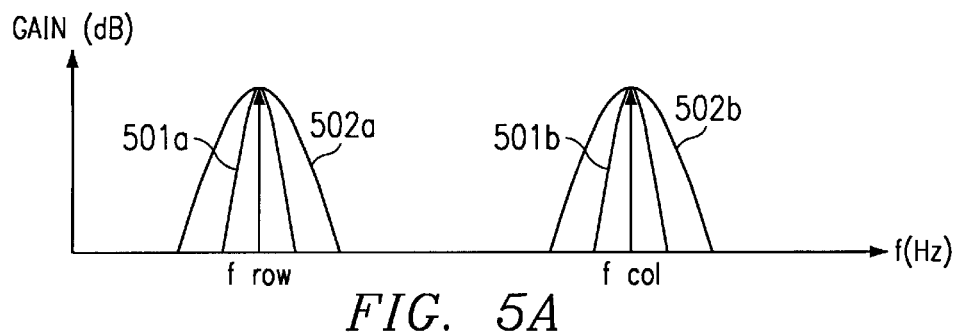
FIGS. 5A and 5B illustrate cases where the amplitude versus frequency curves for the M sample frames are sharper than those of the N sample frames.
Figure 5B:
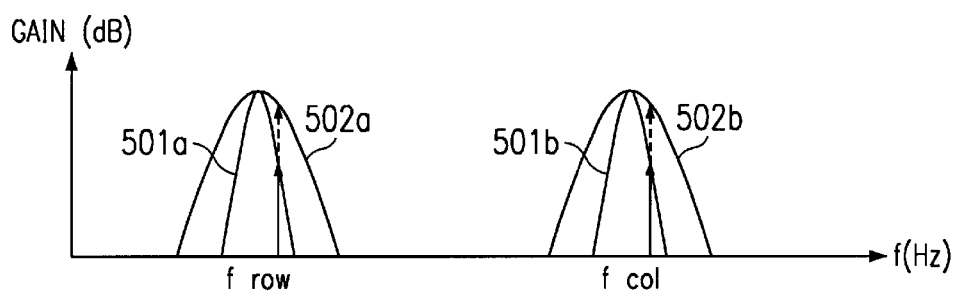
Figure 5C:
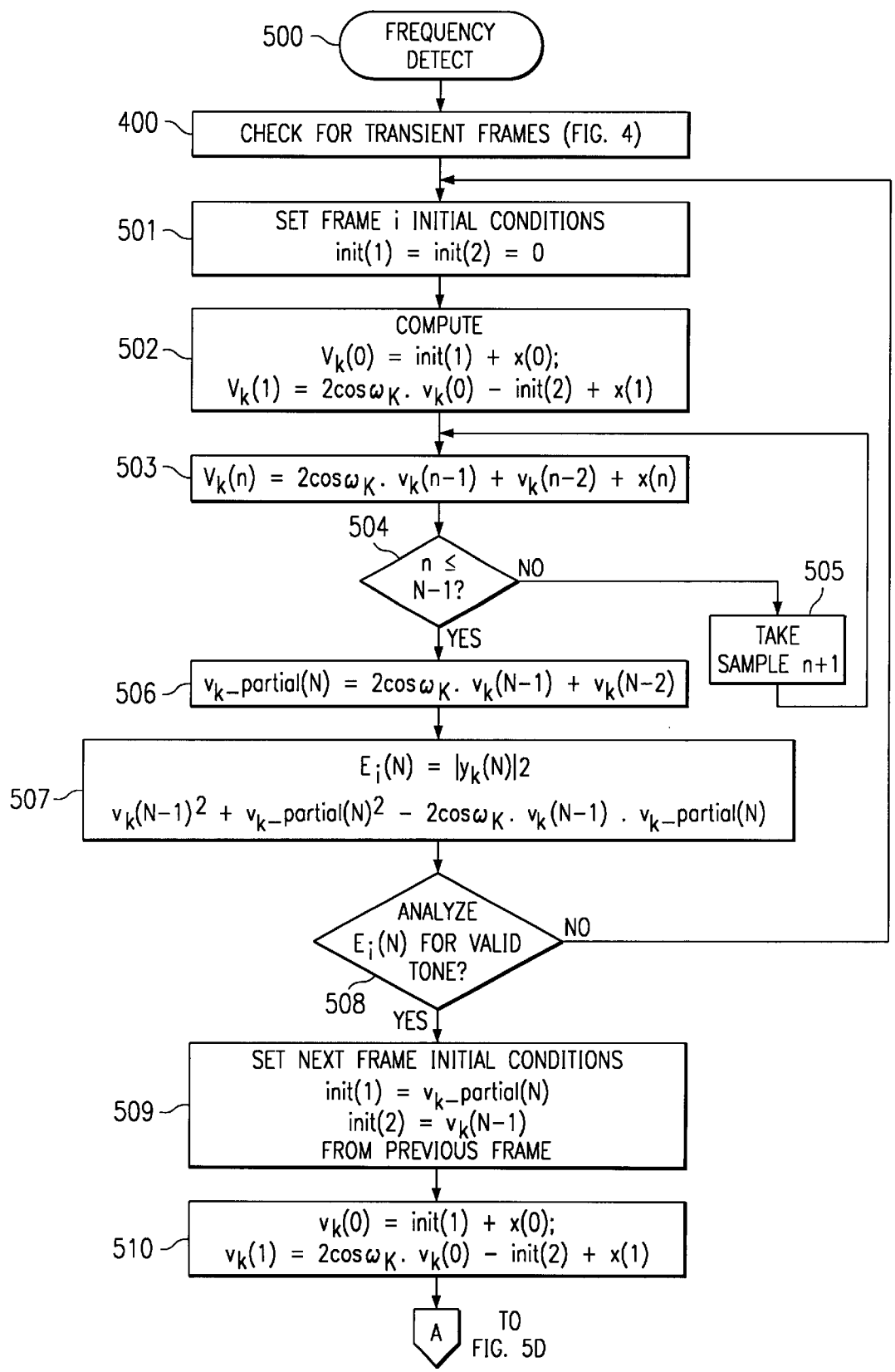
FIGS. 5C and 5D illustrate a preferred filtering procedure for implementing a selected one of the eight Goertzel filters.
Figure 5D:
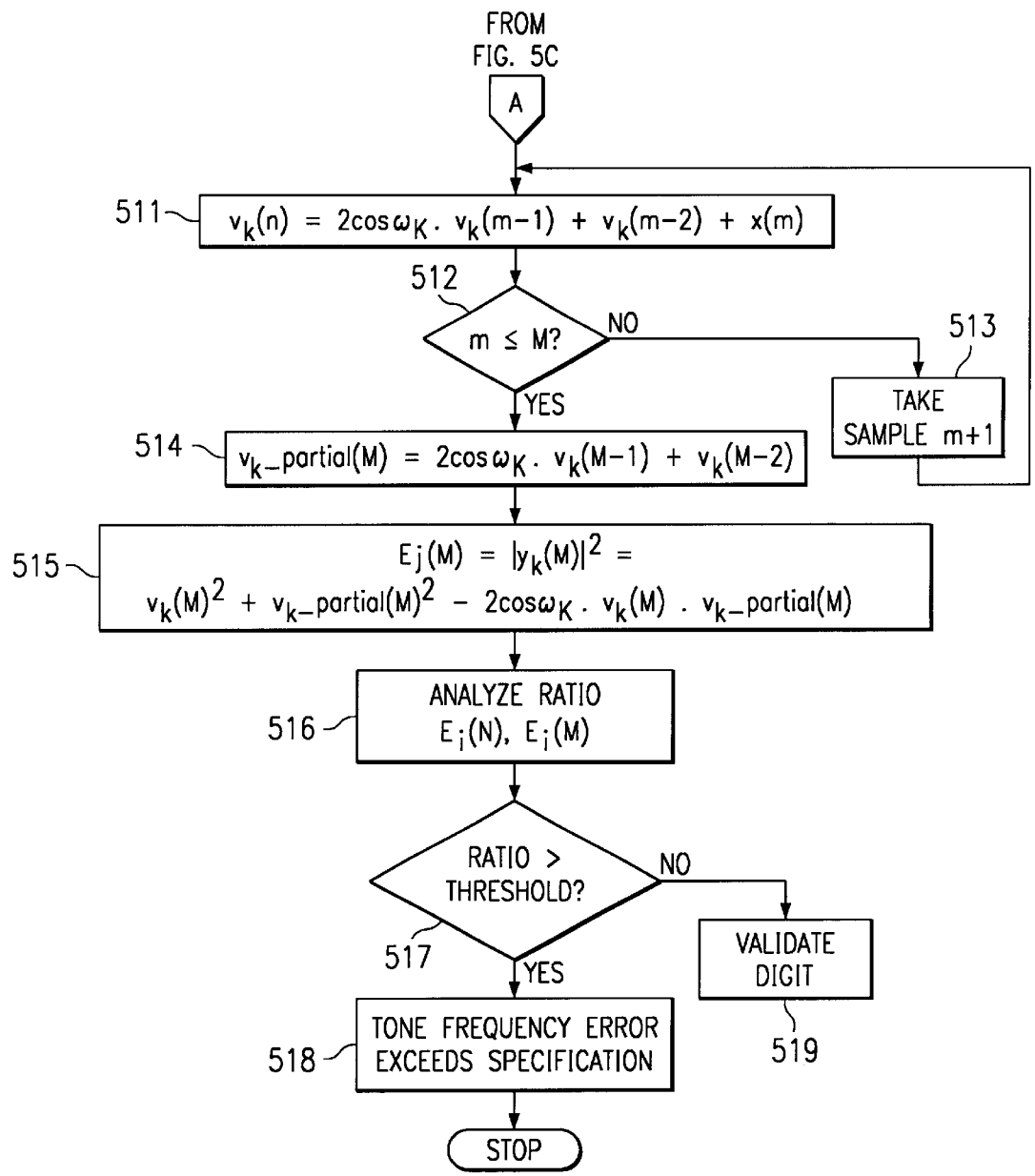

As shown in FIGS. 5A and 5B, the amplitude versus frequency curves 501a,b for the M sample frames are sharper than those of the N sample frames. Thus, when the ratio of $E_j(M)$ to $E_i(N)$ is close to one, the error is small, as shown in FIG. 5A. However, as the frequency error increases, the ratio correspondingly deviates from one, as shown in FIG. 5B. As a result, a threshold on the ratio $E_j(M)/E_i(N)$ can be set (step 517), below which the frequency error can be declared as out of specification (Step 518) and above which the tone can be declared within specification (Step 519). Advantageously, the threshold can be set differently for different tone frequencies.

It should be noted that the principles discussed above can be extended to include the second harmonics of the DTMF tones. In this case, a second set of 8 Goertzel filters are provided which extract the second harmonics from the tones output from the keypads. In this case, the energy ratios are $E_j(M)/E_i(N)$ for each second harmonic are measured against a threshold to determine if the allowable frequency error has been exceeded. The extraction and testing of additional harmonics allows for improved discrimination of the DTMF tones from other signals, such as those produced by speech.

Finally, each "digit" is validated (block 305, FIG. 3). In the preferred embodiment, the row and column tones for the current digit or letter entry from the keypad are observed over a total of four frames. Specifically, an entry is declared valid if for the row and column tones of the corresponding composite signal:

$$F_i = F_{i-1} \text{ AND } F_{i-3} = \text{Null} \quad (6)$$

where $F_i$ is the frequency detected digit (letter) for the current frame, $F_{i-1}$ is that detected for the immediately preceding frame and $F_{i-3}$ is the frequency of the digit (letter) detected for the third previous frame. Note, this procedure does not rely on data from the 2nd previous frame (i.e. $F_{i-2}$) since this frame could be a transient frame. Advantageously, no additional processing overhead is required since the frame data has already been extracted during the filtering process described above.

Finally, while the inventive concepts have been described in view of DTMF-based systems, these concepts can be useful in many other applications, especially in those in which small frequency drifts of short duration signals must be efficiently detected and evaluated. Among these applications are Doppler radar, where the shift in the received signal frequency with reference to a nominal must be estimated, all frequency domain multiple access (DMA) applications, and digital subscriber line (DSL) applications, where sampling frequency drift estimation is required and in Signal analyzer which analyses periodic signals for frequency first and harmonic level contents.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. A method of detecting frequency errors exceeding a predetermined limit in a sampled signal comprising the steps of:

determining a peak amplitude of a tone frequency from a first frame of samples of the sampled signal using a filter having a first amplitude versus frequency response;

determining a peak amplitude of the tone frequency from a second frame of samples of the sampled signal using a filter having a second amplitude versus frequency response;

determining a ratio between the peak amplitude of the first frame and the peak amplitude of the second frame; and comparing the ratio against a threshold to detect frequency errors exceeding the predetermined limit.

2. The method of claim 1 wherein said step of determining a peak amplitude of the first frame comprises the substeps of:

filtering the first frame with a Goertzel filter initialized with a first set of initial conditions to generate a first intermediate result; and determining the peak amplitude by calculating a peak energy for the first frame from the intermediate result.

3. The method of claim 1 wherein said step of determining a peak amplitude of the second frame comprises the substeps of:

filtering the second frame with a Goertzel filter initialized with a second set of initial conditions derived from said step of determining a peak amplitude of the first frame to generate an intermediate result; and determining the peak amplitude by calculating a peak energy for the second frame from the intermediate result.

4. The method of claim 1 and further comprising the steps of validating a selected one of the first and second frames comprising the steps of:

determining a first energy for a first number of samples of the selected frame;

determining a second energy for a second number of samples of the selected frame; and comparing a ratio of the first energy to the second energy with a ratio of the first number of samples to the second number of samples to test for a transient frame.

5. The method of claim 1 wherein the sampled signal comprises a sampled DTMF tone.

6. The method of claim 1 wherein said step of determining a peak amplitude of the tone frequency of the first frame comprises the substeps of: digitally filtering the first frame in accordance with the formula:

$$v_K(n)=2 \cos(\omega_k)v_k(n-1)-v_k(n-2)+x(n)$$

calculating an intermediate value in accordance with the formula:

$$v_{K\_partial}(N)=2 \cos(\omega_k) \cdot v_k(N-1)+v_k(N-2)$$

; and determining the peak amplitude by calculating a peak energy of the first frame in accordance with the formula:

$$E_i(N)=v_K(N)^2+v_{K\_partial}(N)^2-2 \cos(\omega_k) \cdot v_K(N-1) \cdot v_{K\_partial}(N).$$

7. The method of claim 6 wherein said step of determining a peak amplitude of the first frame comprises the substeps of:

digitally filtering the first frame in accordance with the formula:

$$v_K(n)=2 \cos(\omega_k)v_k(n-1)-v_k(n-2)+x(n)$$

with the initial conditions init(1)=$v_{K\_}$ partial (N) and init(2)=$v_K$ (N) calculating an intermediate value in accordance with the formula:

$$v_{K\_partial}(N)=2\cos(\omega_k) \cdot v_k(N-1)+v_k(N-2)$$

; and
determining the peak amplitude by calculating a peak energy of the first frame in accordance with the formula:

$$E_i(N)=v_K(N)^2+v_{K\_partial}(N)^2-2 \cos(\omega_k)v_K(N-1)v_{K\_partial}(N).$$

8. A system for detecting DTMF tones comprising:
a plurality of processing paths each for extracting a corresponding sampled DTMF tone, each processing path operable to:
filter the corresponding tone using a first frame of samples and a first set of initial conditions to generate a first filtered signal having an amplitude corresponding to a first filter response curve;
filter the corresponding tone using a second frame of samples and a second set of initial conditions derived from filtering the first frame of samples to generate a second filtered signal having an amplitude corresponding to a second filter response curve;
determine a ratio between the amplitude of the first frame and the amplitude of the second frame; and
compare the ratio against a threshold to detect frequency errors exceeding the predetermined limit.

9. The system of claim 8 wherein each said processing path comprises software filters having first and second filter response curves for filtering the first and second frames of samples.

10. The system of claim 8 wherein said plurality of processing paths are implemented in operations performed by a digital signal processor.

11. The system of claim 9 wherein each of said processing paths is further operable to test for a transient frame by comparing a power of a first portion of a selected frame with a power of a second portion of the selected frame.

12. The system of claim 9 wherein said system is further operable to detect encoded information by comparing a frequency extracted from first and second consecutive frames with a frequency extracted from a third previous frame.

13. A method of detecting frequency shifts in a sampled signal comprising the steps of:
digitally filtering a first frame of the sampled signal in accordance with the formula:

$$v_K(n)=2 \cos(\omega_k)v_k(n-1)-v_k(n-2)+x(n)$$

, with the initial conditions Vk(-1)=Vk(-2)=0;
calculating an intermediate value for the first frame in accordance with the formula:

$$v_{K\_partial}(N)=2 \cos(\omega_k) \cdot v_K(N-1)+v_K(N-2)$$

; and
determining the peak amplitude for the first frame by calculating a peak energy in accordance with the formula:

$$E_i(N)=v_K(N)^2+v_{K\_partial}(N)^2=2 \cos(\omega_k) \cdot v_K(N-1) \cdot v_{K}-partial(N)$$

digitally filtering a second frame of the sampled signal in accordance with the formula:

$$v_K(n)=2 \cos(\omega_k)v_k(n-1)-v_k(n-2)+x(n)$$

with the initial conditions from the first frame wherein unit(1)=vk =vk__partial(N) and unit(2)=vk(N);
calculating an intermediate value for the first frame in accordance with the formula:

$$v_K partial(N)=2 \cos(\omega_k) \cdot v_k(N-1)+v_k(N-2)$$

wherein vk(1)=init(1) and vk(m-2)=init(2); and
determining the peak amplitude for the first frame by calculating a peak energy of the first frame in accordance with the formula:

$$E_i(N)=v_K(N)^2+v_{K\_partial}(N)^2-2 \cos(\omega_k) \cdot v_K(N-1) \cdot v_K partial(N)$$

; and
comparing the peak energies of the first and second frame to detect frequency drift.

14. The method of claim 13 and further comprising the step of comparing the peak energies of the first and second frames against a threshold value to detect an out of tolerance condition.

15. The method of claim 13 wherein the sampled signal comprises a tone in a DTMF encoded signal.

16. The method of claim 13 wherein a sum of a number of samples in the first frame and a number of samples in the second frame being less than or equal to a number of total samples in a pulse of the sampled signal.

17. The method of claim 16 wherein the number of samples in the first frame and a number of samples in the second frame are equal.

18. The method of claim 16 and further comprising the steps of detecting a transient frame in the sampled signal comprising the substeps of:

calculating a subframe energy for a first subframe of a selected frame of samples of the sampled signal;

calculating a subframe energy for a second subframe of the selected frame of samples of the sampled signal; and calculating a first ratio of the number of samples of the first subframe to the number of samples of the second subframe;

calculating a second ratio of the subframe energy of the first subframe to the subframe energy of the second subframe; and comparing the first and second ratios to detect a transient frame.

19. The method of claim 18 wherein a transient frame is detected when the second ratio is larger than the first ratio by a predetermined threshold amount.

* * * * *